(12) United States Patent
Yamashita

(10) Patent No.: US 9,001,181 B2
(45) Date of Patent: Apr. 7, 2015

(54) IMAGE PROCESSING APPARATUS, IMAGE PROCESSING METHOD, AND COMPUTER PROGRAM PRODUCT

(71) Applicant: Tetsuo Yamashita, Kanagawa (JP)

(72) Inventor: Tetsuo Yamashita, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 106 days.

(21) Appl. No.: 13/852,082

(22) Filed: Mar. 28, 2013

(65) Prior Publication Data

US 2013/0265383 A1 Oct. 10, 2013

(30) Foreign Application Priority Data

Apr. 9, 2012 (JP) ................................. 2012-088395

(51) Int. Cl.
*H04N 7/15* (2006.01)
*G06T 5/00* (2006.01)
*H04N 7/14* (2006.01)

(52) U.S. Cl.
CPC *H04N 7/15* (2013.01); *G06T 5/006* (2013.01); *H04N 7/147* (2013.01); *G06T 2207/30201* (2013.01)

(58) Field of Classification Search
CPC .................................. H04N 7/15; G06T 5/006
USPC ......... 345/633; 348/14.08, 36, 208.14, 208.5, 348/208.99, 218.1, 335; 358/1.9, 3.06, 358/3.26; 382/103, 104, 118, 154, 254, 382/284; 396/55; 455/457; 463/6; 340/541
See application file for complete search history.

(56) References Cited

U.S. PATENT DOCUMENTS

| | | | | |
|---|---|---|---|---|
| 6,142,871 A * | 11/2000 | Inoue | ................................. | 463/6 |
| 6,393,162 B1 * | 5/2002 | Higurashi | ..................... | 382/284 |
| 6,462,773 B1 * | 10/2002 | Koga | ............................. | 348/143 |
| 6,522,837 B2 * | 2/2003 | Izukawa | .......................... | 396/55 |
| 6,532,037 B1 * | 3/2003 | Shimura | ........................ | 348/36 |
| 6,694,251 B2 * | 2/2004 | Negishi et al. | ................ | 701/468 |
| 6,812,835 B2 * | 11/2004 | Ito et al. | ........................ | 340/541 |
| 6,909,790 B2 * | 6/2005 | Chiu et al. | .................... | 382/103 |
| 7,027,823 B2 * | 4/2006 | Mikuni | ......................... | 455/457 |

(Continued)

FOREIGN PATENT DOCUMENTS

| | | |
|---|---|---|
| JP | 2003-230049 | 8/2003 |
| JP | 2011-055291 | 3/2011 |

OTHER PUBLICATIONS

Rei Mochiki, et al., "Robust Human Detection in a Complicated Background using Multiple Gaussian Mixture Skin Models", 2005 The Institute of electronics, information and communication engineers, pp. 37-42 ( with English Translation).

*Primary Examiner* — Gerald Gauthier
(74) *Attorney, Agent, or Firm* — Oblon, McClelland, Maier & Neustadt, L.L.P.

(57) ABSTRACT

An image processing apparatus includes an image acquiring unit that acquires an image of a subject imaged by an image capturing lens; a face detecting unit that detects face information corresponding to a person's face from the image acquired by the image acquiring unit; an image angle-of-view calculating unit that calculates an angle of view of a portion including the face in the image based on the face information detected by the face detecting unit; and a correction necessity determining unit that determines whether distortion correction of the image is need to be performed, based on the angle of view calculated by the image angle-of-view calculating unit and distortion characteristics of the image capturing lens.

5 Claims, 9 Drawing Sheets

(56) References Cited

U.S. PATENT DOCUMENTS

| | | | |
|---|---|---|---|
| 7,336,297 B2* | 2/2008 | Ishigami et al. | 348/143 |
| 7,406,182 B2* | 7/2008 | Ono | 382/104 |
| 7,656,430 B2* | 2/2010 | Miyamaki et al. | 348/208.14 |
| 7,684,591 B2* | 3/2010 | Tamura et al. | 382/103 |
| 7,768,567 B2* | 8/2010 | Azuma | 348/335 |
| 7,782,486 B2* | 8/2010 | Nakano et al. | 358/1.9 |
| 7,983,547 B2* | 7/2011 | Miyasako | 396/55 |
| 8,004,570 B2* | 8/2011 | Saito et al. | 348/208.5 |
| 8,041,078 B2* | 10/2011 | Miyamaki et al. | 382/103 |
| 8,085,308 B2* | 12/2011 | Icho et al. | 348/208.99 |
| 8,175,448 B2* | 5/2012 | Miyasako | 396/55 |
| 8,233,011 B2* | 7/2012 | Takahashi | 345/633 |
| 8,248,480 B2* | 8/2012 | Matsunaga et al. | 348/218.1 |
| 8,265,374 B2* | 9/2012 | Kondo et al. | 382/154 |
| 8,265,410 B1* | 9/2012 | Konoplev | 382/254 |
| 8,279,296 B2* | 10/2012 | Kimura et al. | 348/218.1 |
| 8,400,682 B2* | 3/2013 | Fujii | 358/3.26 |
| 8,433,107 B1* | 4/2013 | Zhang et al. | 382/118 |
| 8,570,589 B2* | 10/2013 | Togami | 358/1.9 |
| 8,654,197 B2* | 2/2014 | Nizko et al. | 348/152 |
| 8,730,524 B2* | 5/2014 | Hoshino et al. | 358/3.06 |
| 2013/0265383 A1* | 10/2013 | Yamashita | 348/14.08 |

* cited by examiner

→ DISABLE DISTORTION CORRECTION

→ ENABLE DISTORTION CORRECTION

IMAGE PROCESSING APPARATUS, IMAGE PROCESSING METHOD, AND COMPUTER PROGRAM PRODUCT

CROSS-REFERENCE TO RELATED APPLICATIONS

The present application claims priority to and incorporates by reference the entire contents of Japanese Patent Application No. 2012-088395 filed in Japan on Apr. 9, 2012.

BACKGROUND OF THE INVENTION

1. Field of the Invention

The present invention relates to an image processing apparatus, an image processing method, and a computer program product suitable for a teleconference system in which images are processed in real-time.

2. Description of the Related Art

In a teleconference system, a camera connected to a terminal that is deployed in each location captures images in the location. During a teleconference, participants in the teleconference need to adjust panning, tilting, zooming, and the like of the camera by themselves to fit the participants into the same image area captured by the camera.

Disclosed in Japanese Patent Application Laid-open No. 2003-230049 to automatize such an operation is a camera controlling apparatus that detects a direction of a sound source using a sound source direction detecting unit, automatically controls panning and tilting of the camera so that the image capturing lens faces the direction of the speaker, extracts a person's face from the image thus captured, and controls panning, tilting, and zooming of the camera so that the person's face thus extracted is displayed at a predetermined position in a predetermined size on a screen.

A camera controlling apparatus such as that disclosed in Japanese Patent Application Laid-open No. 2003-230049 often performs optimizing the captured image. For example, when an image is captured by a camera with a wide-angle lens, because distortions become prominent near the edges of the image, the camera controlling apparatus performs distortion correction.

If the speaker is captured at the center of the screen, distortions are not particularly prominent in the image portion of the speaker. In particular, when only the speaker is displayed in an enlarged manner, there would be no problem in view of the image quality even if the distortions near the edges of the image are not corrected. However, because the conventional technology performs distortion correction to the entire image where distortions are found, without determining whether such distortion correction needs to be performed, an image portion that is not actually displayed on the screen is also subjected to the distortion correction, and a delay is introduced by the distortion correction, disadvantageously.

Therefore, there is a need for an image processing apparatus, an image processing method, and a computer program product that are capable of reducing a delay introduced by the image correction.

SUMMARY OF THE INVENTION

According to an embodiment, there is provided an image processing apparatus that includes an image acquiring unit that acquires an image of a subject imaged by an image capturing lens; a face detecting unit that detects face information corresponding to a person's face from the image acquired by the image acquiring unit; an image angle-of-view calculating unit that calculates an angle of view of a portion including the face in the image based on the face information detected by the face detecting unit; and a correction necessity determining unit that determines whether distortion correction of the image is need to be performed, based on the angle of view calculated by the image angle-of-view calculating unit and distortion characteristics of the image capturing lens.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Embodiments according to the present invention will now be explained. In the embodiments, when an image output from an image capturing apparatus included in a teleconference system is to be processed, a person's face captured in the image is detected, and, when an angle of view is adjusted so that the person's face thus detected is displayed in a large size on the display, the distortion correction is automatically enabled or disabled depending on the angle of view.

Figure 1:
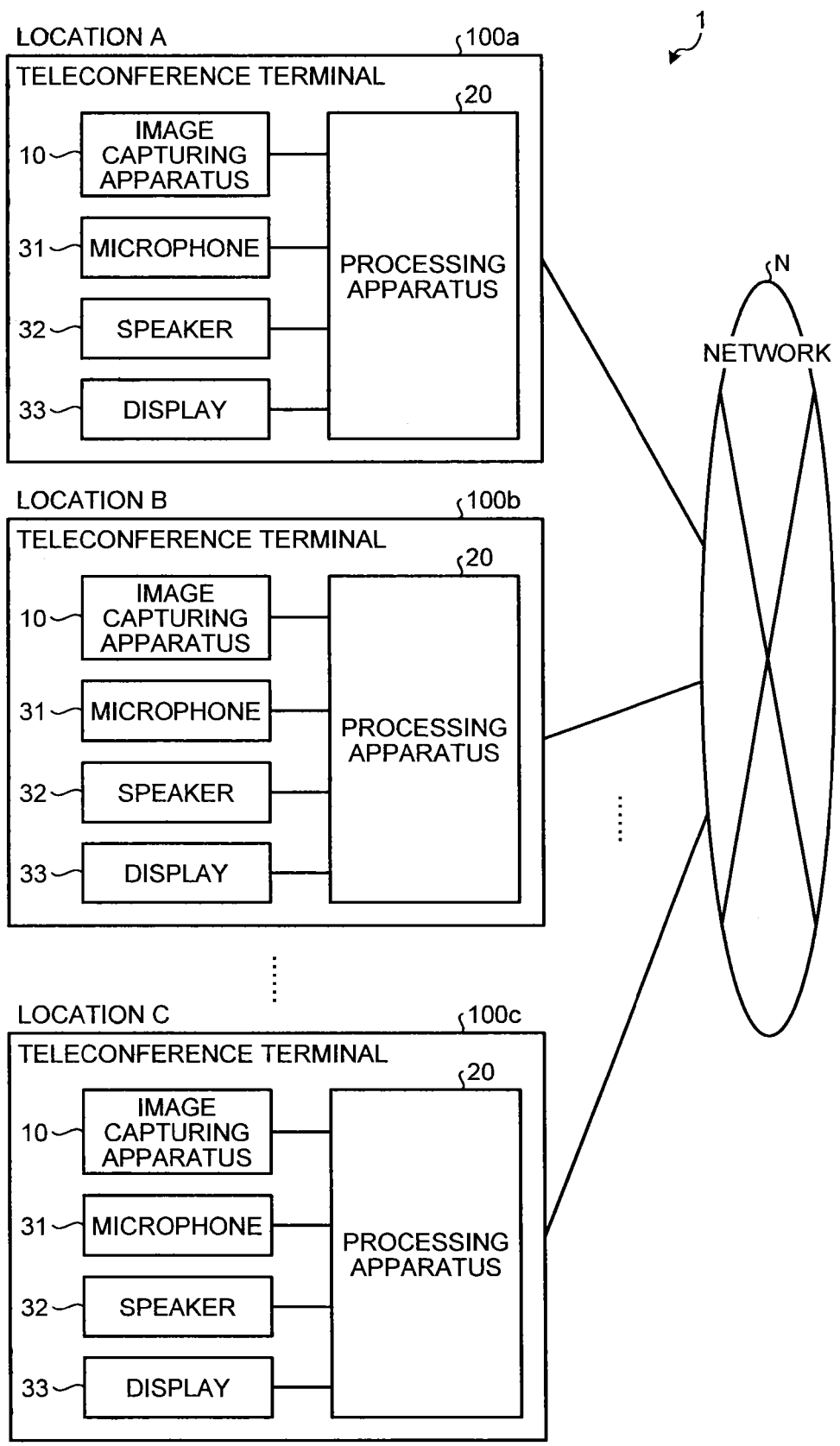
FIG. 1 is a schematic of a general configuration of a teleconference system according to an embodiment of the present invention.

FIG. 1 is a schematic of a general configuration of a teleconference system according to an embodiment of the present invention. This teleconference system 1 includes a plurality of teleconference terminals 100 (100a, 100b, 100c ... ) and a network N connecting the teleconference terminals 100 to one another.

Each of the teleconference terminals 100 includes an image capturing apparatus 10 that captures an image (still image or moving image) of the local location, and a processing apparatus 20 that applies given processing to the image captured by the image capturing apparatus 10.

Each of the teleconference terminals 100 also includes a microphone 31 for collecting sound around the teleconference terminal 100, a speaker 32 for outputting sound collected in other locations, and a display 33 for displaying an image captured by the local image capturing apparatus 10 or image capturing apparatuses 10 in other locations. The microphone 31, the speaker 32, and the display 33 are connected to the processing apparatus 20 as with the image capturing apparatus 10. Various types of data such as an image and sound are exchanged among the teleconference terminals 100 over the network N.

For example, an image captured by the image capturing apparatus 10 included in a teleconference terminal 100a in a location A is subjected to a predetermined image correction such as distortion correction by the processing apparatus 20 in the teleconference terminal 100a, and displayed on the display 33. The image subjected to the corrections is transmitted to teleconference terminals 100b, 100c in other locations (a location B and a location C, respectively) over the network N, and displayed on the respective displays 33.

When the teleconference terminal 100a in the location A receives a zooming-in/zooming-out instruction, the processing apparatus 20 in the teleconference terminal 100a performs a digital zooming processing on the image, and the image thus processed is displayed on the display 33. At the same time, the image subjected to the digital zooming processing is transmitted to the teleconference terminals 100b, 100c in the other locations over the network N, and displayed on the respective displays 33.

In this manner, in the teleconference system 1, an image subjected to a digital zooming processing or a distortion correction is exchanged among the teleconference terminals 100 connected to one another over the network N, and the image is displayed on the respective displays 33 in real-time.

Figure 2:
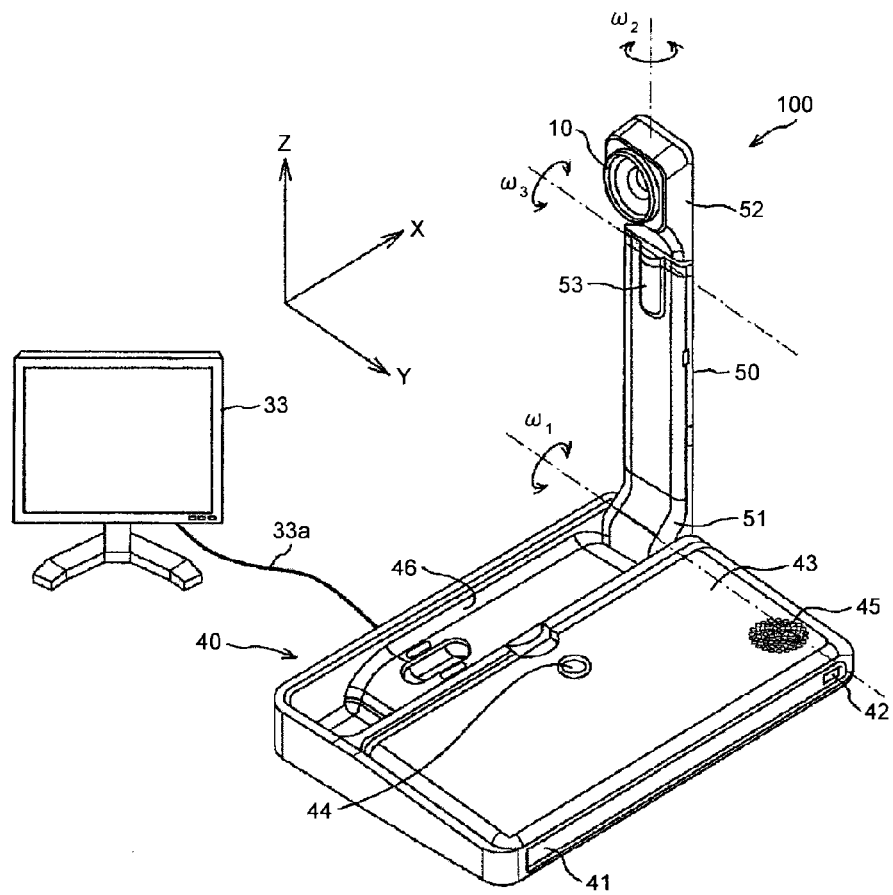
FIG. 2 is a perspective view illustrating an example of the teleconference terminal included in the teleconference system.

An exemplary external appearance of the teleconference terminal 100 will now be explained. FIG. 2 is a perspective view illustrating an example of the teleconference terminal. In FIG. 2, the longitudinal direction of the teleconference terminal 100 in which an arm 50 and a camera housing 52 are housed is explained to be the X axis direction, and the lateral direction is explained to be the Y axis direction (width direction). The direction perpendicular to the X axis direction and to the Y axis direction (vertical direction or height direction) is explained to be the Z axis direction.

The teleconference terminal 100 includes a housing 40 that is approximately cuboid in shape, an arm 50 configured to be folded and fitted in the housing 40, and an camera housing 52 mounted on the tip of the arm 50 and in which the image capturing apparatus 10 is housed.

On a side surface 41 of the housing 40 on one end of the lateral direction, a microphone opening 42 for collecting the sound around the teleconference terminal 100 is formed through the side surface 41. The sound having passed through the microphone opening 42 is collected by a microphone 31 (see FIG. 1) housed in the housing 40.

Provided on the side surface of the housing 40 on the other end of the lateral direction is a video output terminal (not illustrated) outputting an image in the local location captured by the image capturing apparatus 10 or an image received from another teleconference terminal 100 over the network N to the display 33 serving as an external display device. The display 33 is connected to the video output terminal over a cable 33a.

Provided at the center of a top surface 43 of the housing 40 is a power switch 44 for powering on/off the teleconference terminal 100. On one end of a top surface 43 of the housing 40 in the lateral direction, speaker openings 45 are formed through the top surface 43, and the sound output from the speaker 32 (see FIG. 1) housed in the housing 40 is output to external via the speaker openings 45.

Formed on the other end of the top surface 43 of the housing 40 in the lateral direction is a receptacle 46 in which the arm 50 and the camera housing 52 are fitted. The receptacle 46 is a recess formed in a manner so that the arm 50 and the camera housing 52 are perfectly fitted, and in a manner so that the top surface of the housing 40 become approximately horizontal when the arm 50 and the camera housing 52 are folded.

The arm 50 is positioned on the other end of the housing 40 in the lateral direction. A part of the arm 50 is supported by a torque hinge 51 (rotating shaft) so that the arm 50 can be rotated in a forward and backward directions within a given angle range (range of a tilt angle $\omega 1$) with respect to the housing 40. The arm 50 is rotated about the Y axis (up and down directions) in FIG. 2. When the tilt angle $\omega 1=0$ degrees, the arm 50 is fitted in the receptacle 46. FIG. 2 illustrates a configuration in which the arm 50 is rotated by 90 degrees from the angle at which the arm 50 is fitted in the receptacle 46 (tilt angle $\omega 1=90$ degrees), and kept upright with respect to the housing 40. The range of the tilt angle col may be set between 0 degrees to 135 degrees, for example.

The camera housing 52 is positioned on the other end (tip) of the arm 50. The image capturing apparatus 10 is housed in the camera housing 52. The image capturing apparatus 10 is capable of capturing images of people (e.g., participants in the teleconference), characters or symbols written on a document, or interior of the meeting room.

The camera housing 52 is attached to the arm 50 via a two-axis torque hinge 53 (rotating shaft). The camera housing 52 is supported in a rotatable manner in the forward and backward directions about the Z axis (horizontal direction) within a range of a pan angle $\omega 2$, and in a rotatable manner in the forward and backward directions about the Y axis (up and down direction) within a range of a tilt angle $\omega 3$. For example, if the pan angle $\omega 2=0$ degree and the tilt angle $\omega 3=0$ degree in the configuration illustrated in FIG. 2, the range of the pan angle $\omega 2$ can be set as ±180 degrees, and the range of the tilt angle $\omega 3$ can be set as ±45 degrees, for example. In this manner, the camera housing 52 is configured rotatable in the up and down directions, and in the right and left directions with respect to the arm 50, within given angle ranges, respectively.

The teleconference terminal 100 illustrated in FIG. 2 is merely an example, and an apparatus having a different configuration or structure may be used as the teleconference terminal 100. For example, the teleconference terminal 100 may be structured by externally connecting the image capturing apparatus 10, the speaker 32, the microphone 31, and the like to a personal computer (PC). Alternatively, a mobile terminal such as a smartphone including the image capturing apparatus 10, the speaker 32, and the microphone 31 may be used as the teleconference terminal 100. When a PC, a smartphone, or the like is used as the teleconference terminal 100, the apparatus may execute software (computer program) for causing such an apparatus to operate as the teleconference terminal 100.

Figure 3:
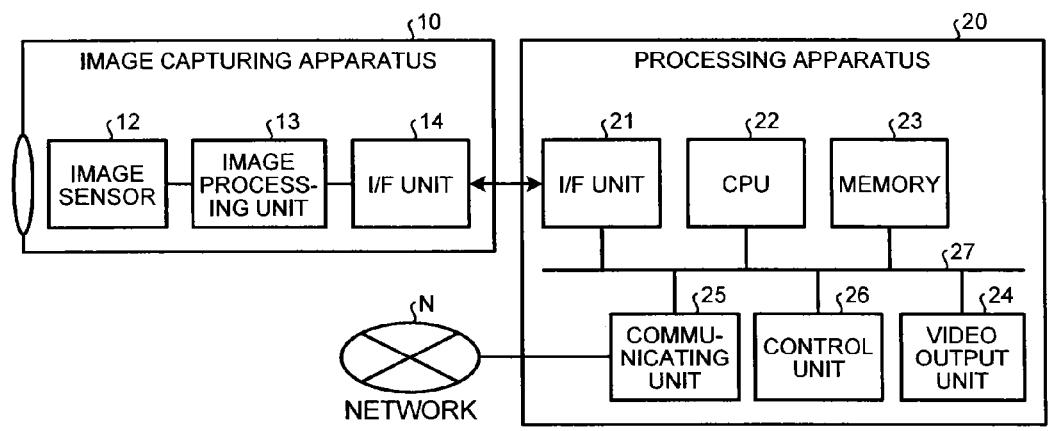
FIG. 3 is a schematic of a hardware configuration of an image processing apparatus included in the teleconference terminal.

FIG. 3 is a schematic of a hardware configuration of an image processing apparatus included in the teleconference terminal. In the embodiment, the image processing apparatus at least includes the image capturing apparatus 10 and the processing apparatus 20.

The image capturing apparatus 10 includes an image capturing lens 11 on which the image of a subject is incident, an image sensor 12 including a charge coupled device (CCD), complementary metal oxide semiconductor (CMOS), or the like that converts an optical image of a subject imaged by the image capturing lens 11 into an analog electric signal, and generates image data (frame image) from the analog electric signal, an image processing unit 13 including an image signal processor (ISP) that performs various image processing to the frame image generated by the image sensor 12, and an interface (I/F) unit 14 for exchanging the frame image, other data, control signals, and the like with the processing apparatus 20.

A wide-angle lens may be used as the image capturing lens 11, for example. A wide-angle lens is preferably used in the teleconference terminal 100 because a location with a limited space (e.g., interior of a meeting room) can be captured more widely.

The processing apparatus 20 includes an I/F unit 21 that transmits and receives frame images, corrected frame images, other data, control signals, and the like to and from the image capturing apparatus 10, a central processing unit (CPU) 22 that executes various processes, a memory 23 that stores therein various types of software, data, frame images, corrected frame images or the like required in the processes executed by the CPU 22, a video output unit 24 that transmits video signals to the display 33 (see FIG. 1) connected to the processing apparatus 20, a communicating unit 25 that exchanges video signals or the like with the other teleconference terminals connected over the network N, a control unit 26 that controls the operations of the entire processing apparatus 20, and a bus 27 connecting these units. The processing apparatus 20 also includes an operation instruction receiving unit for receiving operation instructions from a user, but is not illustrated in FIG. 3. The processing apparatus 20 may be configured as a general computer device, for example.

The image capturing apparatus 10 and the processing apparatus 20 are connected over a wire (e.g., over a universal serial bus (USB)) or wirelessly.

The memory 23 includes a volatile memory such as random access memory (RAM) or nonvolatile memory such as a read-only memory (ROM) or a hard-disk drive (HDD). In the embodiment, these memories are collectively referred to as a memory.

The CPU 22 in the processing apparatus 20 detects a person in an image captured by the image capturing apparatus 10, determines whether distortion correction needs to be performed, based on a range of the image across which the person is captured, and provides an instruction for enabling/disabling the distortion correction to the image processing unit 13. The image processing unit 13 has a function of performing distortion correction based on the distortion correction enabling/disabling instruction received from the processing apparatus 20. This process will be described later more in detail.

Figure 4:
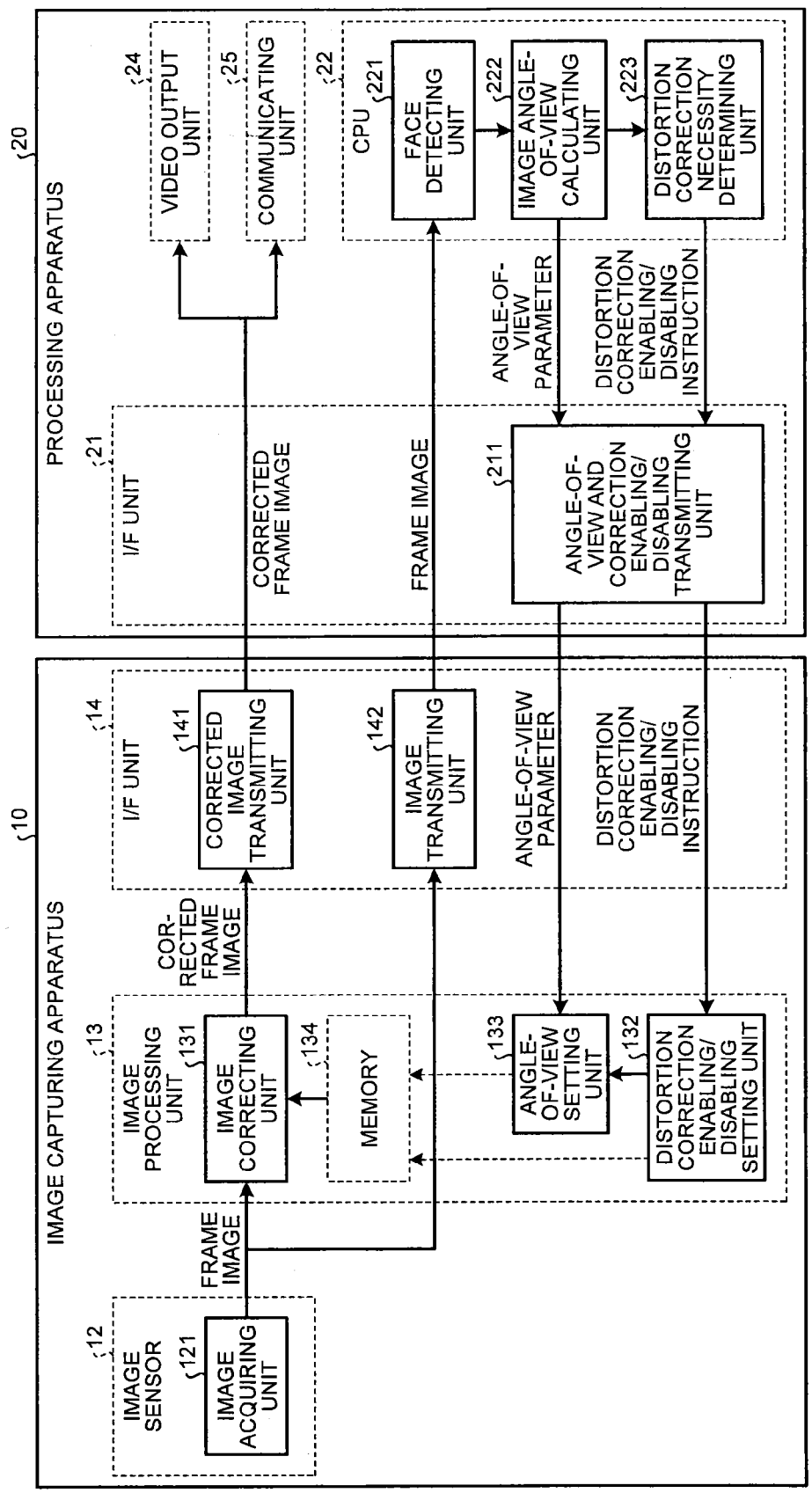
FIG. 4 is a block diagram of the image processing apparatus illustrated in FIG. 3.

FIG. 4 is a block diagram of the image processing apparatus illustrated in FIG. 3. Each of the functional blocks of the image capturing apparatus 10 and the processing apparatus 20 will now be explained.

The functional blocks of the image capturing apparatus 10 will now be explained.

The image sensor 12 includes an image acquiring unit 121 that performs a photoelectric conversion on an optical image of a subject imaged by the image capturing lens 11, and acquires an image data (frame image) that is a still image making up a video. The frame image acquired by the image acquiring unit 121 (frame image before subjected to a correction) is transmitted to an image correcting unit 131 in the image processing unit 13 and an image transmitting unit 142 in the I/F unit 14.

The image processing unit 13 includes the image correcting unit 131 that performs correction on the frame image acquired by the image acquiring unit 121, a distortion correction enabling/disabling setting unit 132 that sets an instruction as to whether distortion correction is to be performed on a frame image, an angle-of-view setting unit 133 that sets an instruction of an angle of view (angle-of-view parameter) for the frame image, and a memory 134 for storing therein settings sent form the distortion correction enabling/disabling setting unit 132 and the angle-of-view setting unit 133.

The image correcting unit 131 corrects the frame image based on the angle-of-view parameter and distortion correction enabling/disabling instruction set to the memory 134 so as to generate a corrected frame image. Specifically, when the distortion correction is set to enabled, the image correcting unit 131 at least performs distortion correction on the frame image received from the image acquiring unit 121, and adjusts the angle of view as required, to generate a corrected frame image. When the distortion correction is set to disabled, the image correcting unit 131 only adjusts the angle of view, to generate a corrected frame image. Herein, adjustment of the angle of view includes extraction of an image and enlargement of an image applied to the frame image. The corrected frame image thus generated is transmitted to a corrected image transmitting unit 141 included in the I/F unit 14.

The angle-of-view parameter is information indicating the size of a partial image to be extracted from the uncorrected frame image. The angle-of-view parameter includes information representing the number of horizontal pixels and the number of vertical pixels. The number of horizontal pixels represents the number of horizontal-direction pixels included in a part of the uncorrected frame image in which the necessary information is captured and acquired by the image acquiring unit 121. The number of vertical pixels represents the number of vertical-direction pixels, with respect to the number of horizontal pixels, allowing the aspect ratio of the uncorrected frame image to be maintained. For example, when necessary information is information representing a person's face, the angle-of-view parameter is set to a range corresponding to a region in which a person's face extracted from the frame image is represented, added with a predetermined width as an allowance. Therefore, the number of horizontal pixels and the number of vertical pixels are equal to or smaller than the number of horizontal pixels and the number of vertical pixels, respectively, included in the uncorrected frame image.

The distortion correction enabling/disabling setting unit 132 sets a distortion correction enabling/disabling instruction received from an angle-of-view and correction enabling/disabling transmitting unit 211 included in the processing apparatus 20 to the memory 134.

The angle-of-view setting unit 133 sets an angle-of-view parameter received from the angle-of-view and correction enabling/disabling transmitting unit 211 included in the processing apparatus 20 to the memory 134. The memory 134 may be a volatile memory, but any other memory may be used.

The I/F unit 14 includes the corrected image transmitting unit 141 that transmits the frame image corrected by the image correcting unit 131 to the video output unit 24 and to the communicating unit 25 in the processing apparatus 20, and the image transmitting unit 142 that transmits the original uncorrected frame image acquired by the image acquiring unit 121 to a face detecting unit 221 in the processing apparatus 20.

The corrected image transmitting unit 141 operates in parallel with the image correcting unit 131 in the image processing unit 13, and transmits the corrected frame image generated by the image correcting unit 131 promptly to the video output unit 24 and to the communicating unit 25.

The face detecting unit 221 calculates the angle-of-view parameter, and determines whether the distortion correction needs to be performed, using the uncorrected frame image received from the image transmitting unit 142. Therefore, the data transmitted from the image transmitting unit 142 includes information representing the entire image acquired by the image acquiring unit 121. Hence, in principle, the information transmitted from the corrected image transmitting unit 141 is smaller than the information transmitted from the image transmitting unit 142, and the corrected frame image is transmitted at a higher rate than that at which the uncorrected frame image is transmitted.

The functional blocks of the processing apparatus 20 will now be explained.

The I/F unit 21 includes the angle-of-view and correction enabling/disabling transmitting unit 211 that transmits a distortion correction enabling/disabling instruction to the distortion correction enabling/disabling setting unit 132, and transmits an angle-of-view parameter to the angle-of-view setting unit 133 in the image processing unit 13.

The CPU 22 includes a face detecting unit 221 that detects face information representing a person's face from the uncorrected frame image received from the image transmitting unit 142, an image angle-of-view calculating unit 222 that calculates an angle of view so that all of the faces fit into the same image area based on the face information detected from the frame image by the face detecting unit 221, and a distortion correction necessity determining unit 223 that determines whether distortion correction needs to be performed on the image in the angle of view calculated by the image angle-of-view calculating unit 222.

The image angle-of-view calculating unit 222 calculates a necessary angle-of-view (angle-of-view parameter) by adding a predetermined width being an allowance to the information representing a person's face detected by the face detecting unit 221.

The distortion correction necessity determining unit 223 outputs a distortion correction enabling signal when distortion correction is necessary, and outputs a distortion correction disabling signal when distortion correction is not necessary.

The image angle-of-view calculating unit 222 transmits the angle-of-view parameter to, and the distortion correction necessity determining unit 223 transmits the distortion correction enabling/disabling signal to the angle-of-view and correction enabling/disabling transmitting unit 211 in the I/F unit 21.

Operations of the image capturing apparatus 10 and the processing apparatus 20 will now be explained, following the order at which the data is processed and transmitted.

In the image capturing apparatus 10, the image acquiring unit 121 acquires a frame image. The frame image thus acquired is transmitted to the image correcting unit 131 in the image processing unit 13 and to the image transmitting unit 142 in the I/F unit 14. The image transmitting unit 142 transmits the frame image to the face detecting unit 221 in the CPU 22 included in the processing apparatus 20.

In the processing apparatus 20, the face detecting unit 221 detects face information from the frame image received from the image transmitting unit 142, and calculates an angle of view (angle-of-view parameter) enabling to fit every person's face into the same image area based on the face information detected by the face detecting unit 221. The angle-of-view parameter thus calculated is transmitted to the angle-of-view and correction enabling/disabling transmitting unit 211 in the I/F unit 21. The distortion correction necessity determining unit 223 determines whether distortion correction needs to be performed on the image within the angle of view thus calculated, and transmits a distortion enabling/disabling instruction to the angle-of-view and correction enabling/disabling transmitting unit 211.

The angle-of-view and correction enabling/disabling transmitting unit 211 transmits the angle-of-view parameter received from the image angle-of-view calculating unit 222 to the angle-of-view setting unit 133 in the image processing unit 13 included in the image capturing apparatus 10. The angle-of-view and correction enabling/disabling transmitting unit 211 also transmits the distortion correction enabling/disabling instruction received from the distortion correction necessity determining unit 223 to the distortion correction enabling/disabling setting unit 132 in the image processing unit 13.

In the image capturing apparatus 10, the angle-of-view setting unit 133 sets the angle-of-view parameter to the memory 134, and the distortion correction enabling/disabling setting unit 132 sets the distortion correction enabling/disabling instruction to the memory 134.

The image correcting unit 131 reads the angle-of-view parameter and distortion correction enabling/disabling instruction set to the memory 134, and performs at least one of: partial extraction followed by enlargement of the image; and a distortion correction on the image, based on the instruction set to the memory 134, and generates a corrected frame image. The corrected frame image thus generated is transmitted to the corrected image transmitting unit 141. The corrected image transmitting unit 141 then transmits the corrected frame image to the video output unit 24 and to the communicating unit 25 included in the processing apparatus 20.

In the processing apparatus 20, the video output unit 24 outputs the corrected frame image thus received to a video output device such as the display 33 connected to the processing apparatus 20. The communicating unit 25 transmits the corrected frame image to the teleconference terminals 100 (see FIG. 1) in the other locations and connected over the network N.

Figure 5:
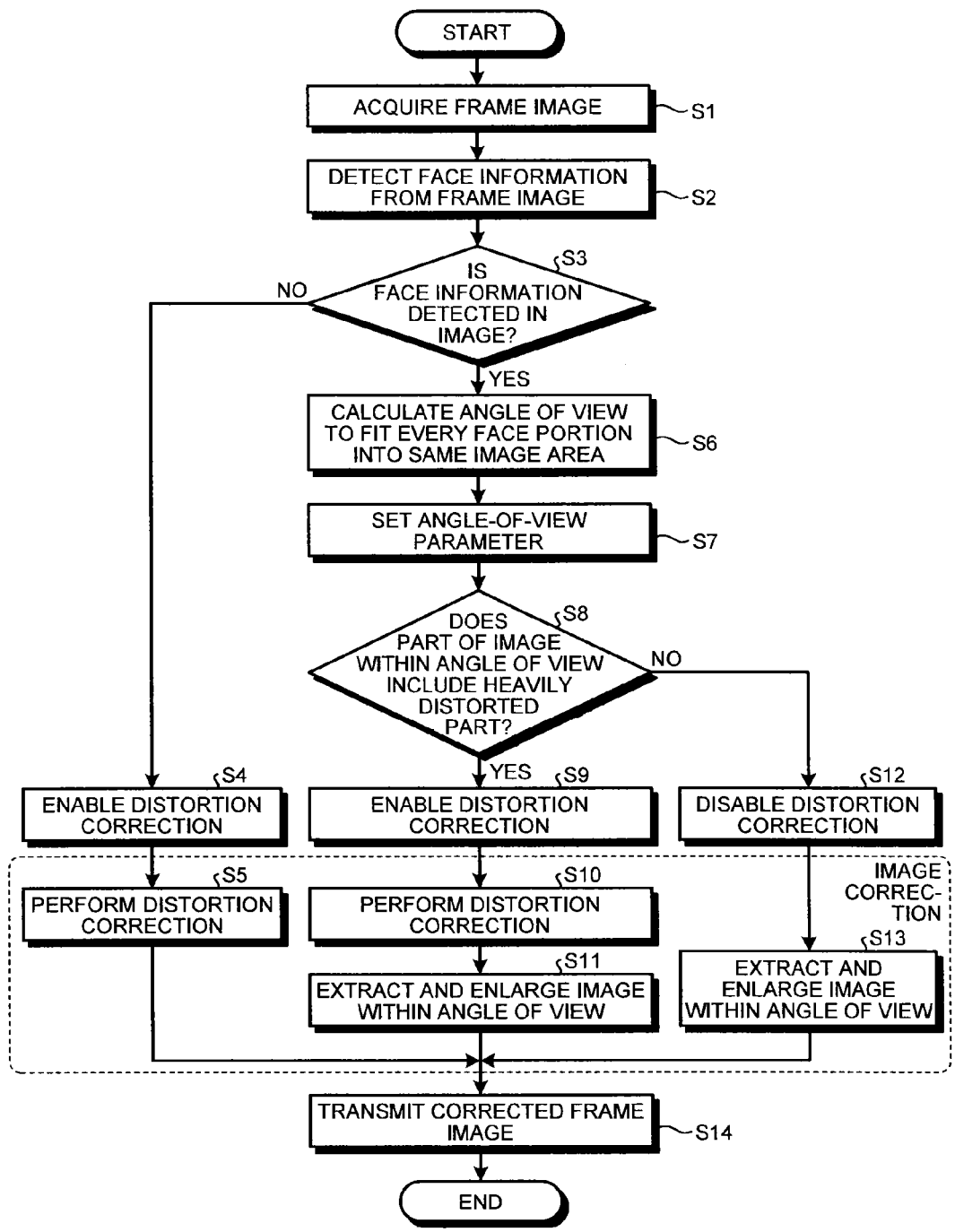
FIG. 5 is a flowchart illustrating exemplary image processing performed by the teleconference terminal according to an embodiment of the present invention.

Image processing performed by the teleconference terminal will now be explained. FIG. 5 is a flowchart illustrating exemplary image processing performed by the teleconference terminal according to the embodiment.

To begin with, the image acquiring unit 121 in the image sensor 12 included in the image capturing apparatus 10 acquires a frame image (Step S1).

The image transmitting unit 142 in the I/F unit 14 transmits the frame image acquired by the image acquiring unit 121 to the face detecting unit 221 in the CPU 22 included in the processing apparatus 20. The face detecting unit 221 detects face information from the frame image (Step S2). To detect face information, a known face information detection technique may be used.

If no face information is detected in the image (No at Step S3), the distortion correction is set to enable without causing the image angle-of-view calculating unit 222 to calculate the angle of view (Step S4). The image correcting unit 131 in the image processing unit 13 included in the image capturing apparatus 10 then corrects the distortions (Step S5).

If face information is detected from the image (Yes at Step S3), the image angle-of-view calculating unit 222 calculates an angle of view to fit the every face information portion into the same image area based on the face information detected by the face detecting unit 221 (Step S6).

The angle-of-view and correction enabling/disabling transmitting unit 211 in the I/F unit 21 included in the processing apparatus 20 then transmits the angle-of-view parameter calculated by the image angle-of-view calculating unit 222 to the angle-of-view setting unit 133 in the image processing unit 13 included in the image capturing apparatus 10. The angle-of-view setting unit 133 sets the angle of view to the memory 134 (Step S7).

The distortion correction necessity determining unit 223 then determines whether the part of the uncorrected frame image, which is within the angle of view calculated by the image angle-of-view calculating unit 222, includes any heavily distorted part (Step S8). In this process, a threshold of an angle of view to determine whether distortion correction needs to be performed is set in advance in the manner suitable for the characteristics of the image capturing lens 11 mounted on the image capturing apparatus 10, and the distortion correction necessity determining unit 223 determines that distortion correction needs to be performed if the angle-of-view parameter calculated by the image angle-of-view calculating unit 222 is larger than the threshold, but determines that distortion correction needs not to be performed if the angle-of-view parameter is equal to or less than the threshold.

The distortion correction necessity determining unit 223 transmits the determination result to the angle-of-view and correction enabling/disabling transmitting unit 211. The angle-of-view and correction enabling/disabling transmitting unit 211 transmits the determination result to the distortion correction enabling/disabling setting unit 132. If distortion correction needs to be performed (Yes at Step S8), the distortion correction enabling/disabling setting unit 132 issues a distortion correction enabling instruction (Step S9).

The image correcting unit 131 then performs distortion correction (Step S10), and extracts a partial image within the angle of view specified in the angle-of-view parameter from the uncorrected frame image, and performs enlargement of the extracted image (Step S11).

If distortion correction needs not to be performed (No at Step S8), the distortion correction enabling/disabling setting unit 132 issues a distortion correction disabling instruction (Step S12). The image correcting unit 131 extracts, according to the angle-of-view parameter, a partial image within the angle of view specified in the angle-of-view parameter from the uncorrected frame image, and performs enlargement of the extracted image (Step S13).

At Steps S5, S10, S11, and S13, the corrected frame image corrected by the image correcting unit 131 is transmitted from the I/F unit 14 in the image capturing apparatus 10 to the video output unit 24 and to the communicating unit 25 in the processing apparatus 20 (Step S14).

Here, a face information detecting process performed by the face detecting unit 221 (Step S2) will now be explained.

A known face information detection technique may be used for the face information detection. For example, a face information may be detected using a skin models acquired by a Gaussian mixture model (GMM), as disclosed in "GMM ni yoru hada moderu wo mochiita haikei ni robasuto na jinbutu kensyutu (Robust Human Detection in a Complicated Background using Multiple Gaussian Mixture Skin Models)", Institute of Electronics, Information and Communication Engineers (IEICE) Technical Report, vol. 105, no. 375, PRMU 2005-99, pp. 37-42, October 2005. The process using the face information detection disclosed in the IEICE Technical Report is generally as follows.

To begin with, as a preliminary process, skin models need to be prepared. Specifically, a sampling image including only a skin region is converted from a red, green, and blue (RGB) color model into a hue, saturation, and value (HSV) color model, and a plurality of skin models are prepared using only the H component and the S component. To prepare the skin models, the Gaussian mixture model (GMM) is used.

The face detecting unit 221 detects face information using the skin models prepared in advance in the manner described above (the process at Step S2). Specifically, the face detecting unit 221 converts the frame image in the RGB color model received from the image transmitting unit 142 into the HSV color model, and extracts candidates for skin colors from all of the pixels included in the frame image. At this time, the face detecting unit 221 uses the GMM, and selects pixels satisfying predetermined likelihood as candidates for the skin colors. The face detecting unit 221 then selects a skin model that is most appropriate for the skin color candidates thus extracted, from the skin models prepared in advance. Using the most appropriate skin model, the face detecting unit 221 determines whether the color represented in each of the pixels in the frame image is a skin color. In this manner, the face detecting unit 221 can detect a part having a skin color, that is, a part corresponding to a person's face from the frame image.

Alternatively, an approach in which face information is detecting by extracting the edge of a face from an image, or an approach allowing face information to be identified by sampling and learning from examples may also be used.

Figure 6:
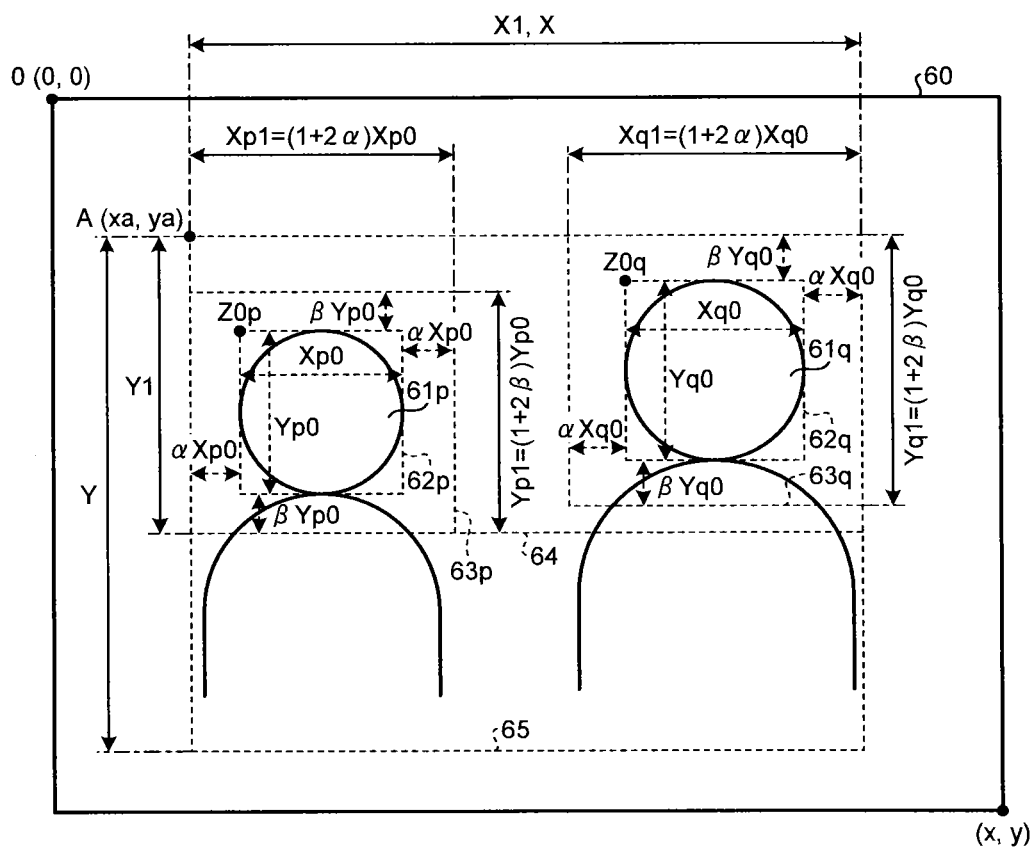
FIG. 6 is a schematic for explaining how an angle of view is calculated.

A method by which the image angle-of-view calculating unit 222 calculates an angle of view will now be explained. FIG. 6 is a schematic for explaining how an angle of view is calculated. The information representing a person positioned on the left side in FIG. 6 is appended with a symbol p, and the information representing a person positioned on the right side is appended with a symbol q. When information representing the right person and the left person are not especially distinguished, the symbols p and q are omitted in the explanation. The process applied to the information representing the person positioned on the left side will be mainly explained, however, the information representing the person positioned on the right side is processed in the same manner.

The face detecting unit 221 detects a person's face (face information portion 61) from an uncorrected frame image 60 illustrated in FIG. 6. In the example explained below, the process is applied to a rectangle including the face information portion 61.

For every face information portion 61 ($61p$, $61q$) thus detected, a first rectangle 62 ($62p$, $62q$) is specified in a manner surrounding the corresponding face information portion 61 ($61p$, $61q$). When a plurality of pieces of face information are detected from the frame image 60, a plurality of first rectangles are specified.

The first rectangle 62 is a shape including the pixels along the upper edge, the bottom edge, the left edge, and the right edge of the face information portion 61, for example. The position and the area within the first rectangle 62 in the frame image 60 can be identified by using the coordinates of an upper left point Z0 ($Z0p$, $Z0q$) of the first rectangle 62, and the size of first rectangle 62 (the number of horizontal pixels and the number of vertical pixels).

Used as a representation format of the coordinates, for example, is a format in which the coordinate value increases toward the right and toward the bottom, from the point of origin (0, 0) positioned at the upper left corner of the image. The size of the frame image illustrated in is xxy, and the size of the first rectangle 62p including the face information portion 61p located on the left side in FIG. 6 is Xp0×Yp0.

A second rectangle 63 (63p, 63q) that is an extension of the first rectangle 62 is then specified. Specifically, acquired for the first rectangle 62p is a rectangle in which each of the right side and the left side of the first rectangle 62p is extended by α×Xp0, and each of the upper side and the lower side is extended by β×Yp0. The portions extended from the first rectangle 62 serves as an allowance for allowing the face information portion 61 to be displayed at a position interspaced from an edge of the display, when an enlargement of the image including the face information portion 61 is displayed on a display. Herein, α and β are enlargement ratios, and may be specified as α=0.3, β=0.2, for example. The enlargement ratios are values that are determined based on characteristics of each of the units included in the teleconference terminal provided with the angle-of-view adjustment function according to the embodiment.

The size of the second rectangle 63p extended in the manner described above can be represented as Xp1×Yp1 where Xp1=(1+2α)Xp0, and Yp1=(1+2β)Yp0.

A third rectangle 64 (X1×Y1) including all of the second rectangles 63 in the frame image is then specified. In FIG. 6, because two pieces of face information corresponding to two persons' faces are detected, two second rectangle 63p (Xp1×Yp1) and second rectangle 63q (Xq1×Yq1) are detected from the frame image, and both of these rectangles are included in the third rectangle 64. When face information corresponding to only a single person's face is detected in the frame image 60, the third rectangle 64 becomes identical to the second rectangle 63.

Finally, a fourth rectangle 65 (X×Y) is then acquired by extending the third rectangle 64 in a manner maintaining the aspect ratio of the frame image 60. The fourth rectangle 65 corresponds to a region extracted and enlarged by the image correcting unit 131 (see FIG. 4). In the embodiment, because the number of horizontal pixels in the frame image is x and the number of vertical pixels is y, the aspect ratio can be said to be x:y. At this time, the size of the fourth rectangle 65 can be calculated as follows:

When $X1/Y1 < x/y, X=Y1 \times x/y, Y=Y1$  Pattern 1

This is a case in which the third rectangle is vertically long with respect to the frame image. In such a case, the right side and the left side of the third rectangle are equally extended, to acquire the fourth rectangle.

When $X1/Y1 = x/y, X=X1, Y=Y1$  Pattern 2

This is a case in which the aspect ratio of the third rectangle is the same as that of the frame image. In such a case, the third rectangle is used as the fourth rectangle.

When $X1/Y1 > x/y, X=X1, Y=X1 \times y/x$  Pattern 3

This is a case in which the third rectangle is horizontally long with respect to the frame image. In such a case, the fourth rectangle is acquired by extending the third rectangle downwardly (the pattern illustrated in FIG. 6). Of course, the third rectangle may be extended upwardly.

The angle-of-view parameter is set based on the fourth rectangle 65 thus acquired. As mentioned earlier, the angle-of-view parameter includes at least information representing the number of horizontal pixels X and the number of vertical pixels Y of the fourth rectangle 65. The angle-of-view parameter may also include information representing the coordinates (xa, ya) of a point A positioned at the upper left of the fourth rectangle 65 in FIG. 6.

Figure 7A:
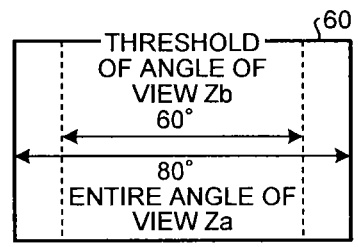
FIGS. 7A to 7C are schematics for explaining a relation between the angle of view and whether distortion correction is required.
Figure 7B:
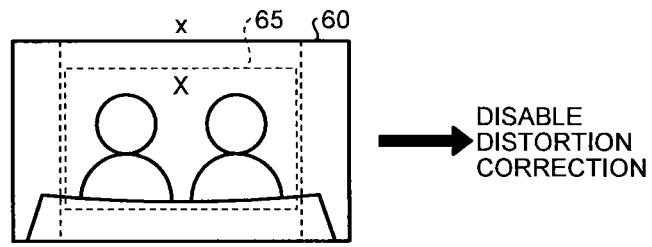
Figure 7C:
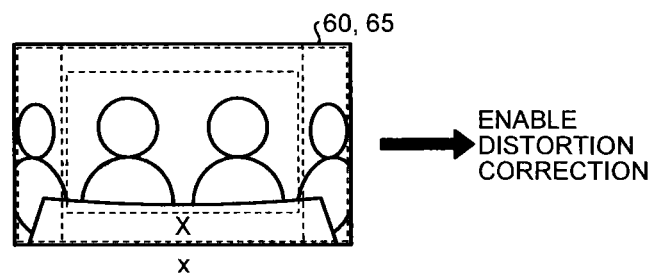

A method for calculating the angle of view will now be explained. FIGS. 7A to 7C are schematics for explaining how the angle of view is calculated.

The angle of view, which is a range captured by the image capturing apparatus, and the distortion characteristics of the image thus captured are determined according to an image capturing lens in use. Therefore, an angle of view in which distortion correction needs to be performed is also determined according to the image capturing lens. For example, as illustrated in FIG. 7A, it is assumed herein that used is an image capturing lens that can capture an image at an angle of view (the angle of view for the uncorrected frame image 60) of 80 degrees, and in which a distortion is prominent at an angle of view of 60 degrees or more. In such a case, an image including a portion with an angle of view of 60 degrees or more needs to be subjected to distortion correction, and an image only including a portion with an angle of view less than 60 degrees needs not be subjected to any distortion correction. The distortion correction necessity determining unit 223 then determines whether the angle of view of the fourth rectangle 65 (region including face information) from which the image is extracted is an angle of view in which distortion correction needs to be performed.

The entire angle of view, which is an extent capable of being captured by the image capturing apparatus, is represented as za. The threshold of angle of view to determine whether distortion correction needs to be performed is represented as zb. The number of horizontal pixels in the fourth rectangle is represented as X, and the number of horizontal pixels in the frame image is represented as x. When zb/za>X/x is satisfied, the distortion correction necessity determining unit 223 issues an instruction for disabling the distortion correction (FIG. 7B), but when not satisfied, the distortion correction necessity determining unit 223 issues an instruction for enabling the distortion correction (FIG. 7C).

The range of the image to be extracted determined in the manner described above, and a correction performed by the image correcting unit 131 based on the distortion correction enabling/disabling instruction will now be explained specifically.

Figure 8:
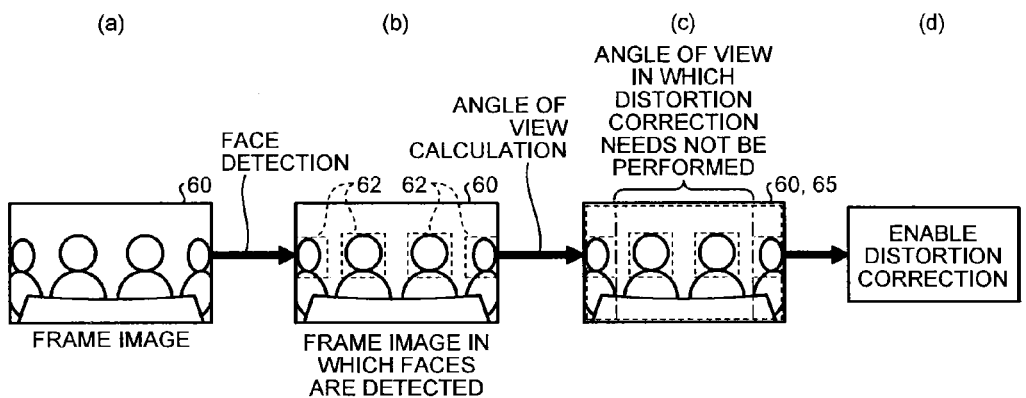
FIG. 8 is a schematic illustrating an exemplary process performed by the processing apparatus.
Figure 9:
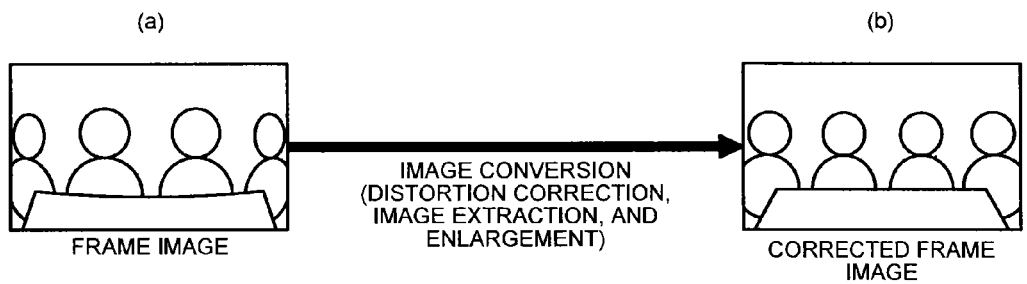
FIG. 9 is a schematic illustrating an exemplary process performed by an image correcting unit included in an image capturing apparatus.

FIG. 8 is a schematic illustrating an exemplary process performed by the processing apparatus, and FIG. 9 is a schematic of an exemplary process performed by the image correcting unit included in the image capturing apparatus. FIG. 9 illustrate an example in which the image correcting unit performs distortion correction only.

To begin with, in the processing apparatus 20, the face detecting unit 221 detects face information corresponding to a person's face from the uncorrected frame image 60 illustrated in (a) of FIG. 8. Further, (b) of FIG. 8 illustrates how the first rectangles 62 are set to the respective face information portions thus detected. The image angle-of-view calculating unit 222 calculates an image area to be extracted from the frame image 60 (the fourth rectangle 65), as illustrated in (c) of FIG. 8. In this example, because the rectangle that is the first rectangle 62 added with a given allowance exceeds the resolution of the frame image 60, image extraction is not performed.

The distortion correction necessity determining unit 223 then determines whether the angle of view represented in the fourth rectangle 65 is an angle of view in which distortion correction needs to be performed. As illustrated in (c) of FIG. 8, because the angle of view represented in the fourth rectangle 65 is larger than an angle of view in which distortion correction needs not to be performed, the distortion correction necessity determining unit 223 issues an instruction for enabling the distortion correction.

The image correcting unit 131 performs only distortion correction to the uncorrected frame image illustrated in (a) of FIG. 9, to generate a corrected frame image illustrated in (b) of FIG. 9. The corrected image transmitting unit 141 then transmits the corrected frame image thus generated to the video output unit 24 and to the communicating unit 25.

Figure 10:
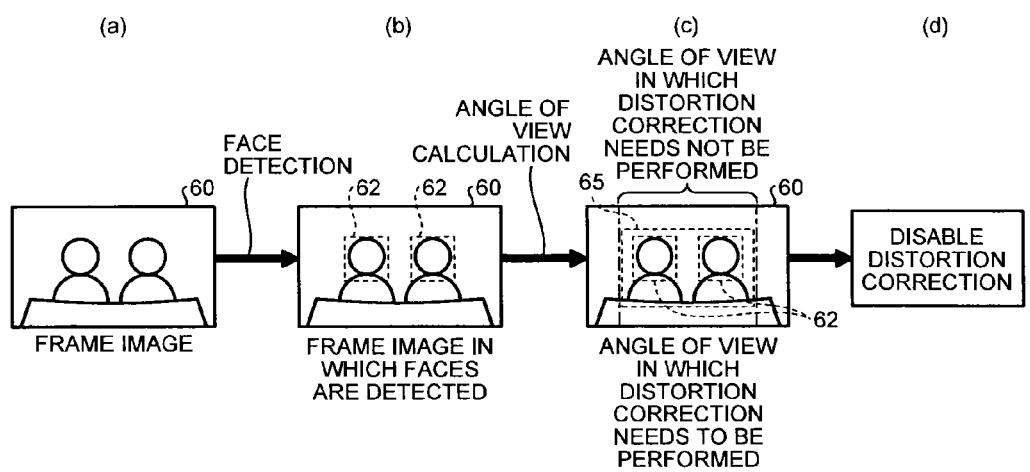
FIG. 10 is a schematic illustrating another exemplary process performed by the processing apparatus.
Figure 11:
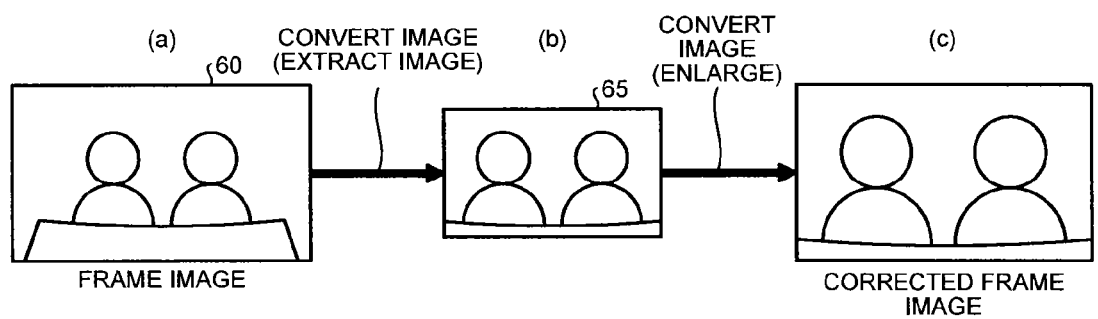
FIG. 11 is a schematic illustrating another exemplary process performed by the image correcting unit included in the image capturing unit.

FIG. 10 is a schematics illustrating another exemplary process performed by the processing apparatus. FIG. 11 is a schematics of another exemplary process performed by the image correcting unit included in the image capturing unit. FIG. 11 illustrate an example in which the image correcting unit performs an image extraction and an image enlargement, and not distortion correction.

To begin with, the face detecting unit 221 detects face information corresponding to a person's face from the uncorrected frame image illustrated in (a) of FIG. 10. Furthermore, (b) of FIG. 10 illustrates how the first rectangles 62 are set to the respective face information portions thus detected. The image angle-of-view calculating unit 222 calculates the image area of the image to be extracted (the fourth rectangle 65) from the frame image 60, as illustrated in (c) of FIG. 10. The distortion correction necessity determining unit 223 then determines whether the angle of view represented in the fourth rectangle 65 is an angle of view in which distortion correction needs to be performed. In (c) of FIG. 10, because the angle of view represented in the fourth rectangle 65 is not larger than the angle of view in which distortion correction needs to be performed, the distortion correction necessity determining unit 223 issues an instruction for disabling the distortion correction.

The image correcting unit 131 extracts a partial image from the uncorrected frame image illustrated in (a) of FIG. 11, as illustrated in (b) of FIG. 11, and enlarges the image thus extracted, to generate a corrected frame image illustrated in (c) of FIG. 11. The corrected image transmitting unit 141 then transmits the corrected frame image thus generated to the video output unit 24 and the communicating unit 25.

In the manner described above, according to the embodiment, when the angle of view is to be adjusted so that a person's face captured in an uncorrected frame image is displayed on a display in a large size, the distortion correction is automatically enabled or disabled depending on whether the angle of view represented in the image portion including face information portion detected from the uncorrected frame image is larger than an angle of view in which distortion correction needs to be performed. Therefore, a delay caused by the distortion correction can be reduced, while maintaining the image quality.

Figure 12:
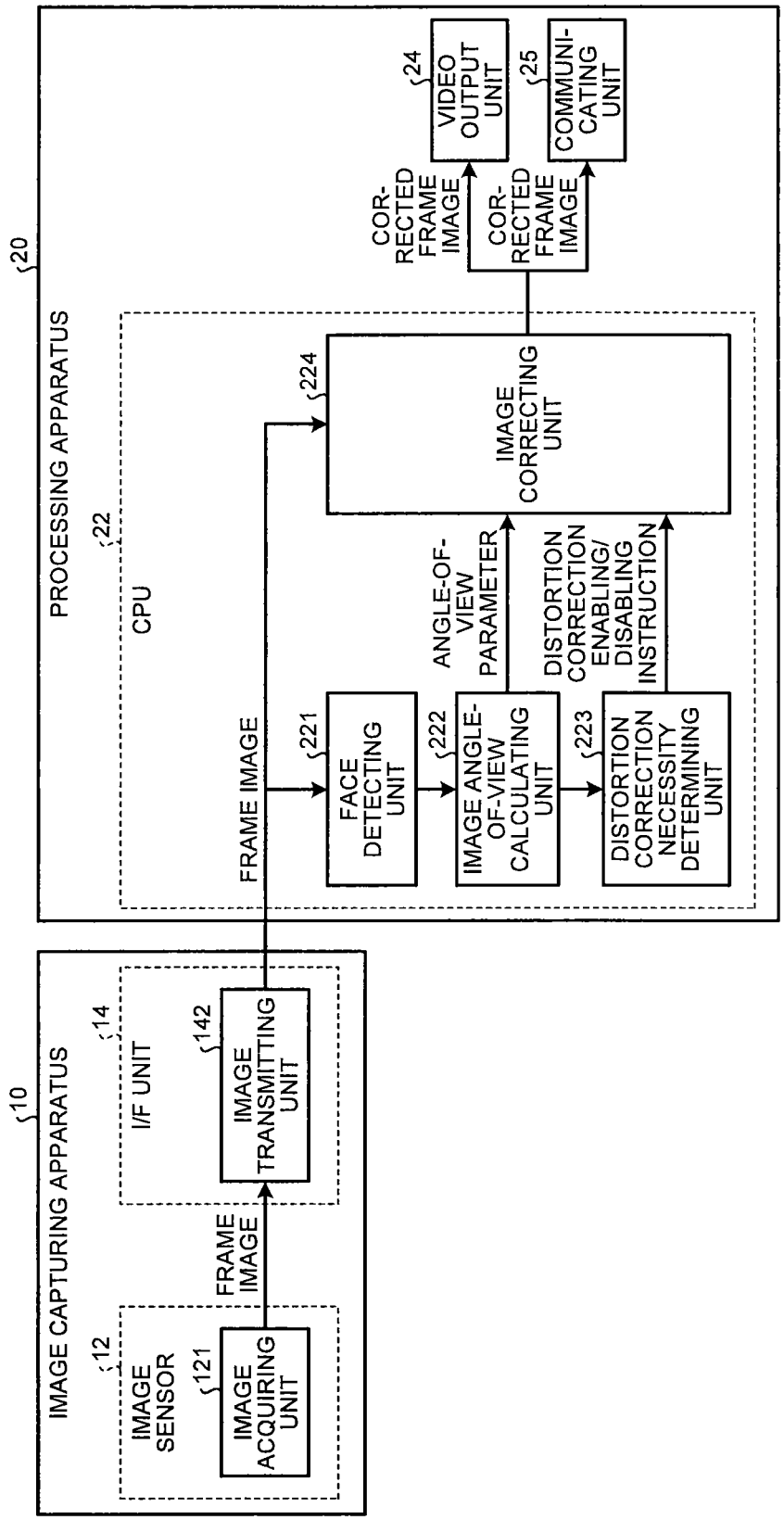
FIG. 12 is a functional block diagram of an image processing apparatus according to another embodiment of the present invention.

The image processing apparatus according to another embodiment of the present invention will now be explained. FIG. 12 is a functional block diagram of the image processing apparatus according to the other embodiment. The image processing apparatus at least includes the image capturing apparatus 10 and the processing apparatus 20, in the same manner as in the above-described embodiment. This embodiment is characterized in that the distortion correction and the like are performed by the processing apparatus. In the explanation below, the same members as those in the embodiment described above are assigned with the same reference numerals.

The image capturing apparatus 10 includes the image sensor 12 having the image acquiring unit 121 that acquires a frame image, and the I/F unit 14 having the image transmitting unit 142 that transmits the frame image acquired by the image acquiring unit 121 to the face detecting unit 221 in the processing apparatus 20.

The CPU 22 in the processing apparatus 20 includes the face detecting unit 221 that detects face information corresponding to a person's face in the frame image received from the image transmitting unit 142, the image angle-of-view calculating unit 222 that calculates an angle of view so that every piece of face information detected by the face detecting unit 221 fits into the same image area, the distortion correction necessity determining unit 223 that determines whether distortion correction needs to be performed on the image area within the angle of view calculated by the image angle-of-view calculating unit 222 based on the angle of view, and an image correcting unit 224 that generates a corrected frame image by correcting the frame image based on the angle of view calculated by the image angle-of-view calculating unit 222 and the distortion correction enabling/disabling instruction received from the distortion correction necessity determining unit 223.

In this manner, in this embodiment, the image correcting unit 224 is included in the processing apparatus 20, instead of the image capturing apparatus 10. Because the operation performed by each of these units is the same as that according to the first embodiment, an explanation thereof is omitted herein.

As described above, according to the embodiment, even when the image capturing apparatus 10 without a distortion correction function is used, the processing apparatus 20 can determine whether distortion correction needs to be performed and automatically enables or disables the distortion correction. Therefore, a delay introduced by the distortion correction can be reduced while maintaining the image quality.

According to the present invention, because determination is made as to whether distortion correction needs to be performed based on an angle of view of a portion including the face in a captured image, based on the face information, and the distortion correction is automatically enabled and disabled, introduction of a delay by a distortion correcting process can be reduced.

The present invention can be implemented in any convenient form, for example using dedicated hardware, or a mixture of dedicated hardware and software. The present invention may be implemented as computer software implemented by one or more network processing apparatus. The network can comprise any conventional terrestrial or wireless communications network, such as the Internet. The processing apparatus can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implemental on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
    an image acquiring unit that acquires an image of a subject imaged by an image capturing lens;
    a face detecting unit that detects face information corresponding to a person's face from the image acquired by the image acquiring unit;
    an image angle-of-view calculating unit that calculates an angle of view of a portion including the face in the image based on the face information detected by the face detecting unit;
    a correction necessity determining unit that determines whether distortion correction of the image needs to be performed, based on whether the portion including the face within the angle of view calculated by the image angle-of-view calculating unit includes a distorted part that is determined according to distortion characteristics of the image capturing lens; and
    an image correcting unit that performs distortion correction on the image when the correction necessity determining unit determines that the distortion correction of the image needs to be performed.

2. The image processing apparatus according to claim 1, wherein the correction necessity determining unit determines whether the distortion correction of the image needs to be performed, based on comparison between a predetermined value including a lower limit of angle of view that needs the distortion correction, which is determined according to the distortion characteristics of the image capturing lens, and a ratio of the number of pixels calculated from the angle of view of the portion including the face to the number of pixels of the image captured by the image acquiring unit.

3. The image processing apparatus according to claim 1, wherein the correction necessity determining unit determines that the distortion correction needs to be performed when the ratio is lower than the predetermined value, and determines that the distortion correction needs not to be performed when the ratio is equal to or greater than the predetermined value.

4. An image processing method performed in an image forming apparatus, the method comprising:
    acquiring an image of a subject imaged by an image capturing lens;
    detecting information corresponding to a person's face from the image acquired;
    calculating an angle of view of a portion including the face in the image based on the face information detected;
    determining whether distortion correction of the image needs to be performed, based on whether the portion including the face within the angle of view calculated includes a distorted part that is determined according to distortion characteristics of the image capturing lens; and
    performing distortion correction on the image when it is determined that distortion correction of the image needs to be performed.

5. A computer program product comprising a non-transitory computer-readable medium including an image processing program, the program causing a computer used in an image forming apparatus to execute:
    acquiring an image of a subject imaged by an image capturing lens;
    detecting face information corresponding to a person's face from the image acquired;
    calculating an angle of view of a portion including the face in the image based on the face information detected;
    determining whether distortion correction of the image needs to be performed, based on whether the portion including the face within the angle of view calculated includes a distorted part that is determined according to distortion characteristics of the image capturing lens; and
    performing distortion correction on the image when it is determined that distortion correction of the image needs to be performed.

* * * * *